United States Patent
Wengerter et al.

(10) Patent No.: US 7,230,995 B2
(45) Date of Patent: Jun. 12, 2007

(54) INTERLEAVER PATTERN MODIFICATION

(75) Inventors: Christian Wengerter, Langen (DE); Alexander Golitschek Edler Von Elbwart, Langen (DE); Eiko Seidel, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1060 days.

(21) Appl. No.: 10/244,105

(22) Filed: Sep. 16, 2002

(65) Prior Publication Data

US 2003/0072353 A1    Apr. 17, 2003

(30) Foreign Application Priority Data

Oct. 10, 2001    (EP) ................... 01124165

(51) Int. Cl.
*H04L 27/04* (2006.01)
*H04L 27/22* (2006.01)
(52) U.S. Cl. ...................... 375/295; 375/316
(58) Field of Classification Search ............... 375/141, 375/144, 259–267, 295, 299, 347, 316; 714/756; 370/320, 335, 342, 441; 341/50
See application file for complete search history.

(56) References Cited

U.S. PATENT DOCUMENTS

| | | | |
|---|---|---|---|
| 6,473,418 B1 | 10/2002 | Laroia et al. | |
| 6,476,734 B2 * | 11/2002 | Jeong et al. | .......... 341/50 |
| 6,542,478 B1 * | 4/2003 | Park | .......... 370/308 |
| 6,563,807 B1 * | 5/2003 | Kim et al. | .......... 370/331 |

FOREIGN PATENT DOCUMENTS

| | | |
|---|---|---|
| EP | 0881795 | 12/1998 |
| EP | 0892501 | 1/1999 |
| JP | 20004205 | 1/2000 |
| JP | 2000299680 | 10/2000 |

OTHER PUBLICATIONS

Japanese Office Action dated Jan. 31, 2006 with English translation.
European Search Report dated Apr. 3, 2002.
A. Elezabi, et al.: "Two-stage Detection of Coded CDMA Systems and a Novel Interleaving Scheme", Computers and Communications, 1997, Proceedings., Second IEEE Symposium on Alexandria, Egypt, Jul. 1, 1997, pp. 551-555, XP010241412.
T. S. Wong, et al.: "Combined Coding and Successive Interference Cancellation with Random Interleaving for DS/CDMA Communications", IEEE Vehicular Technology Conference, New York, NY, vol. 3 conf. 50, Sep. 19, 1999, pp. 1825-1829, XP000922422.

* cited by examiner

*Primary Examiner*—Don N. Vo
(74) *Attorney, Agent, or Firm*—Stevens, Davis, Miller & Mosher, LLP

(57) ABSTRACT

The invention provides a method of interleaving a source data stream using an interleaver pattern in a transmitter. A mother interleaver pattern and an interleaver parameter are accessed. The mother interleaver pattern is modified using said interleaver parameter. Then, the modified interleaver pattern is applied in the transmitter for interleaving the source data stream. The interleaver parameter used by the transmitter for modifying said mother interleaver pattern differs from the interleaver parameter used simultaneously by at least one other transmitter that transmits data at the same time on the same channel. The invention further provides a corresponding deinterleaving method. By decorrelating the interleaver processes in the different streams, the inter-stream interference is reduced.

8 Claims, 4 Drawing Sheets

INTERLEAVER PATTERN MODIFICATION

BACKGROUND OF THE INVENTION

1. Field of the Invention

The invention relates to interleaving a source data stream and deinterleaving an interleaved data stream and to corresponding transmitters and receivers, and is in particular suitable for use with block-based interleavers.

2. Description of the Related Art

It is well known in the art to employ interleavers to obtain some limited form of time diversity, particularly for wireless communications systems which suffer from signal fading effects due to the variance of the radio channel characteristics. An example of a communication system in which transmitters and receivers interleave and deinterleave data, respectively, is depicted in FIG. 1.

In FIG. 1 a transmitter 100, 110, 120, 130 transmits data on a channel 140 to a receiver 150, 160, 170, 180. The transmitter obtains data from signal source 100, and this data then undergoes forward error correction (FEC) which is done by FEC encoder 110, so that convolutional codes or codes derived therefrom are obtained. The output of the FEC encoder 110 is forwarded as source data stream to the interleaver 120.

Interleavers, also known as permuters, are used for minimising the effect of noise bursts and fading in a data transmission system. An interleaver is generally implemented using a block structure or a convolutional structure. Variations of block interleavers are also used in communication systems. Other interleavers include S-Random Interleaver, Dithered-Golden Interleaver, Pseudo-Noise (PN) Interleaver, etc.

A block interleaver formats the encoded data in a rectangular array. Usually, each row of the array constitutes a code word or vector of a length that corresponds to the number of columns. The bits are read out column-wise and transmitted over the channel. At the receiver, the deinterleaver stores the data in the same rectangular array format, but it is read out row-wise, one code word at a time. As a result of this reordering of the data during transmission, a burst of errors is broken down into a number of bursts, which number corresponds to the number of rows in the rectangular array during encoding. Other implementations of block interleavers exist such as those which use only one vector.

A convolutional interleaver can be used in place of a block interleaver in much the same way.

The process of interleaving and the actual interleaver functionality will be better understood considering the following example. Assuming that the source data stream which is submitted to the interleaver is an input sequence $x_k$, the function of the interleaver can be described as permuting the input sequence $x_k$ to an output sequence $y_k$ according to $$y_k = x_{f(k)},$$

where f(k) is a permutation function that might for instance be $$f(k)=1+[(7*k) \bmod 54]$$

with k running from 1 to 54, and where 54 is, in the present example, the length of one code block. Applying this example function, the input sequence would be mapped to an output sequence according to $(y_1 y_2 \ldots y_{54}) = (x_8 x_{15} x_{22} x_{29} x_{36} x_{43} x_3 x_{10} x_{17} \ldots x_{41} x_{48} x_1)$.

The conventional interleaving techniques are especially disadvantageous in communication systems where data of a plurality of different transmitters is simultaneously conveyed on one channel. This is depicted in more detail with reference to FIG. 2.

Referring to the figure, there are three transmitting devices shown that transmit data on the same channel 140. The individual transmitters are of essentially the same construction but transmit data from different signal sources 200, 210, 220. Each of the data from the individual signal sources are first FEC encoded in the respective encoder 110, and are then interleaved by interleaver 230 before being modulated by modulator 130.

The transmission scheme depicted in FIG. 2 is disadvantageous because there is some form of interference between the multiple data streams which negatively affects the system performance. This is since the multiple data streams that share the same radio resource simultaneously, do not fulfil the general requirement of perfect orthogonatility. In particular, the interference can produce burst errors that can render the transmitted data unreadable to the respective receivers.

SUMMARY OF THE INVENTION

There are provided methods for interleaving a source data stream and deinterleaving an interleaved data stream, and corresponding transmitters and receivers, where the interstream interference may be reduced.

In one embodiment, there is provided a method of interleaving a source data stream using an interleaver pattern in a transmitter. The method comprises accessing a mother interleaver pattern, accessing an interleaver parameter, modifying the mother interleaver pattern using the interleaver parameter, and applying the modified interleaver pattern in the transmitter for interleaving the source data stream. The interleaver parameter used by the transmitter for modifying the mother interleaver pattern differs from the interleaver parameter used simultaneously by at least one other transmitter that transmits data at the same time on the same channel.

In another embodiment, a transmitter comprises an interleaver for interleaving a source data stream using an interleaver pattern. The interleaver is adapted for accessing a mother interleaver pattern, accessing an interleaver parameter, modifying the mother interleaver pattern using the interleaver parameter, and applying the modified interleaver pattern for interleaving the source data stream. The interleaver parameter used by the transmitter for modifying the mother interleaver pattern differs from the interleaver parameter used simultaneously by at least one other transmitter that transmits data at the same time on the same channel.

In still another embodiment, a method of deinterleaving a data stream using a deinterleaver pattern in a receiver is provided. The method comprises accessing a mother deinterleaver pattern, accessing a deinterleaver parameter, modifying the mother deinterleaver pattern using the deinterleaver parameter, and applying the modified deinterleaver pattern in the receiver for deinterleaving the data stream. The deinterleaver parameter used by the receiver for modifying the mother deinterleaver pattern differs from the deinterleaver parameter used simultaneously by at least one other receiver that receives data at the same time on the same channel.

In a further embodiment, a receiver may be provided that comprises a deinterleaver for deinterleaving a data stream using a deinterleaver pattern. The deinterleaver is adapted for accessing a mother deinterleaver pattern, accessing a deinterleaver parameter, modifying the mother deinterleaver pattern using the deinterleaver parameter, and applying the modified deinterleaver pattern for deinterleaving the data stream. The deinterleaver parameter used by the receiver for modifying the mother deinterleaver pattern differs from the deinterleaver parameter used simultaneously by at least one other receiver that receives data at the same time on the same channel.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 3:
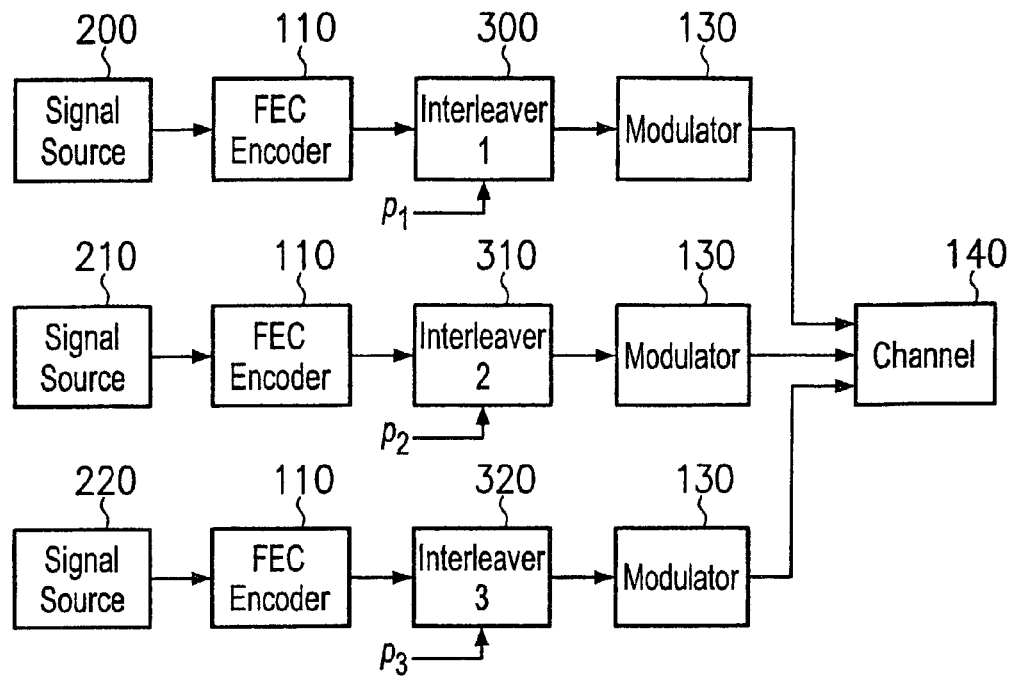
FIG. 3 illustrates the transmitter side of a communication system according to an embodiment.

Referring now to FIG. 3, an embodiment will be described discussing the transmission side of the communication system. The receiver side will not be discussed in detail in order to not unnecessarily obscure the invention. Knowing how the embodiments works on the transmitter side will enable the skilled person to design the receiver side in a very straight forward way by providing the corresponding inverse counterparts of the individual units found on the transmitter side.

As shown in FIG. 3 each data transmitting device that transmits data on the same channel 140 includes an interleaver 300, 310, 330 that is distinct, i.e. the interleavers differ from each other in the respective interleaver pattern used. As will be discussed in more detail below, in embodiments the interleavers 300, 310, 320 each receive a parameter $p_i$, i=1,2,3, that is used for generating the respective interleaver pattern.

There are a number of different possible ways of how to obtain distinct interleaver patterns from these parameters.

One way of generating interleaver patterns is to modify a given mother interleaver pattern. Before the interleaver can start, an input vector of length N has to be available at the input of the interleaver, i.e. N symbols are required to be input. For the purpose of describing the embodiments, the term symbol refers to any data element or data unit that can be used for dividing a vector. N denotes the interleaver length and is a parameter given by the communication system to which the interleaver is applied. The embodiment preferably makes use of interleaver lengths of at least two.

The modification of the mother interleaver pattern is done by applying an algorithm that depends on the respective interleaver parameter $p_i$. An embodiment of such an algorithm is the cyclic shifting of the input sequence of symbols. This will now be discussed with reference to FIG. 4.

Figure 4:
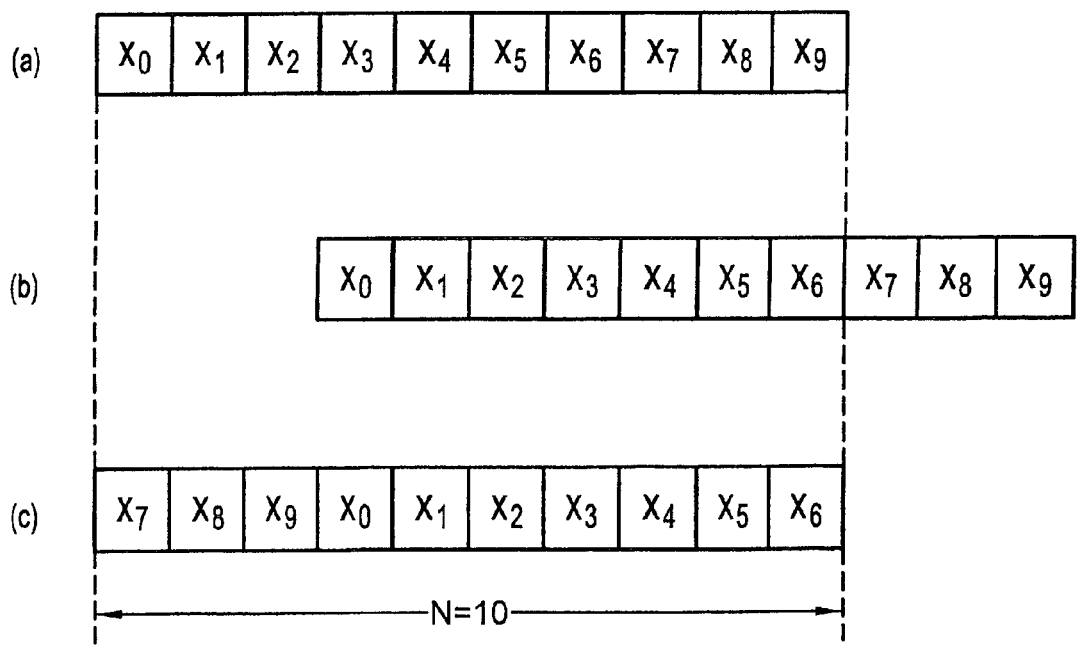
FIG. 4 illustrates the cyclic shifting scheme of an embodiment.

Assuming the source data stream consists of a sequence of symbols having positions $x_k$, k=0, . . . , N−1, the data stream undergoes the "cyclic shifting" procedure before interleaving. For this purpose, a cyclic shifting parameter π is introduced for each transmitter i, $p_i=\pi_i,$ which shifts the input by π positions in a cyclic fashion which means that within each vector, a bit position of greater than N is wrapped around to an equivalent position in the same vector. In the example of FIG. 4, the value of N is 10 and the cyclic shifting parameter π is equal to 3. Starting from sequence (a) of FIG. 4, the symbols are shifted by three to the right to obtain the sequence (b), and symbols $x_7$, $x_8$ and $x_9$ are wrapped around to obtain the sequence depicted in (c) of FIG. 4. It should be understood that the intermediate sequence (b) is shown in the figure for explanation reason only, as the sequence (c) can be obtained from the starting sequence (a) in a one-step operation.

Thus, the input symbol position has changed from $x_k$ to $x'_k$ according to $x'_k=[x_k+\pi] \bmod N$ where mod is the well known modulo function. It will be appreciated that the relation is identical for any value of π that is offset by N. Therefore, the range for varying the parameter π can be set, without loss of generality, to the integer number range starting from 0 and running to N−1.

When identical mother interleaver patterns are used, a total of N different interleaver patterns can be obtained. Moreover, it will be appreciated that setting the interleaver parameter π to 0 results in using the mother interleaver pattern itself.

While the cyclic shifting scheme shown in FIG. 4 has been discussed as being performed on the source data stream before interleaving, it will be appreciated that the scheme can also be applied to the output sequence. Assuming that the output sequence symbol positions $y_k$ are obtained from the input symbol positions $x_k$ according to $y_k=f(x_k)$ where the function f describes the characteristics of the mother interleaver, the cyclic shifting of the output sequence can be described by $y_k=[f(x_k)+\pi] \bmod N.$ In another embodiment, the cyclic shifting scheme is performed both on the input sequence and the output sequence. This leads to a higher flexibility in choosing the distinct interleavers, and thus to a higher number of possible distinct interleavers to be used or chosen.

It will be appreciated that when the cyclic shifting scheme is performed both before and after the interleaving process, the algorithms can run completely separately from each other but can in an alternative approach also use the same parameters. Therefore, in one embodiment the interleaver parameters $p_i$, i=1,2,3, are used for both cyclic shifting processes in the same manner whereas in another embodiment the parameters $p_i$, i=1,2,3, are actually tuples containing two different values, one being used for cyclic shifting the input sequence and the other being used for cyclic shifting the output sequence:

$$p_i = \langle \pi^{in}, \pi^{out} \rangle_i.$$

Due to the combination of different algorithms, different interleaver pattern tuples might lead in certain combinations to an identical interleaver behaviour for different streams. These cases depend on the parameter N which is a parameter given by the system. The selection of interleaver pattern parameters is therefore preferably done by avoiding those tuples which lead to identical interleavers. When it is determined that a parameter tuple is given that tends to result in an identical interleaver behaviour for different streams, this tuple is exchanged by another tuple.

Another embodiment of how to obtain distinct interleaver patterns from a mother pattern is the biased mirroring scheme which will now be discussed with reference to FIGS. 5 and 6.

Mirroring itself would result in a process which can be achieved by simply reversing the order of the positions, i.e.

$$x'_k = (N-1) - x_k.$$

In order increase the variability, a centre position parameter $\gamma$ is introduced for each transmitter i:

$$p_i = \gamma_i.$$

The parameter $\gamma$ is an integer multiple of 0.5. It acts as the mirroring point if it is an integer number, or it gives the mirroring centre between two positions [$\gamma$−0.5; $\gamma$+0.5] if it is not an integer number. Since the mirroring position is now no longer the centre of the vector, the present mirroring scheme is called "biased mirroring".

Figure 5:
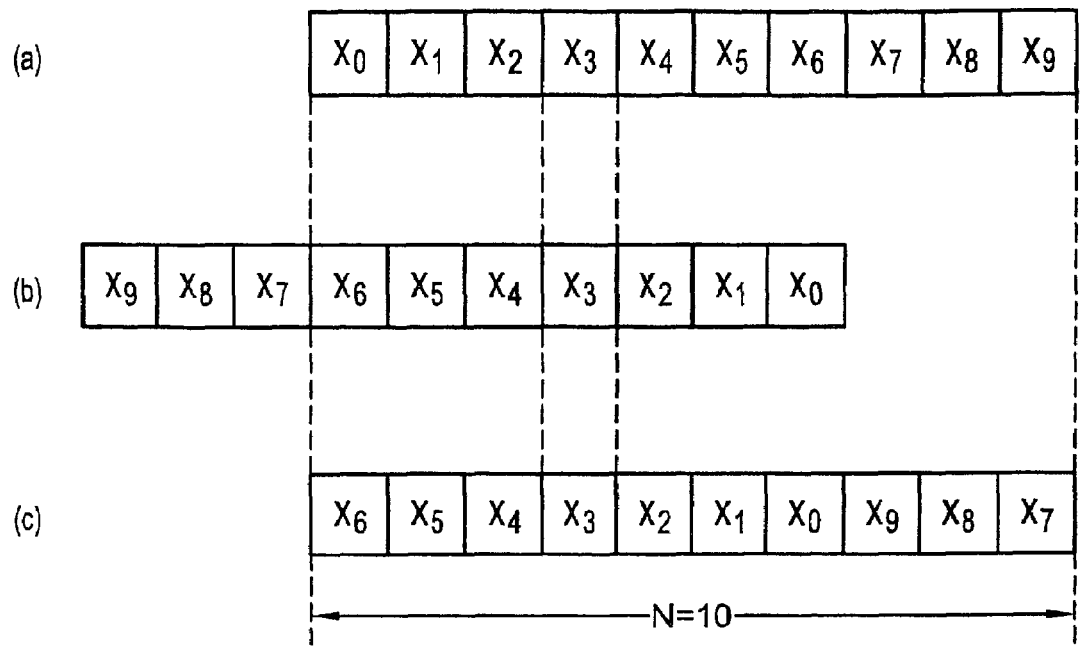
FIG. 5 depicts a biased mirroring scheme according to an embodiment having an integer mirror position.
Figure 6:
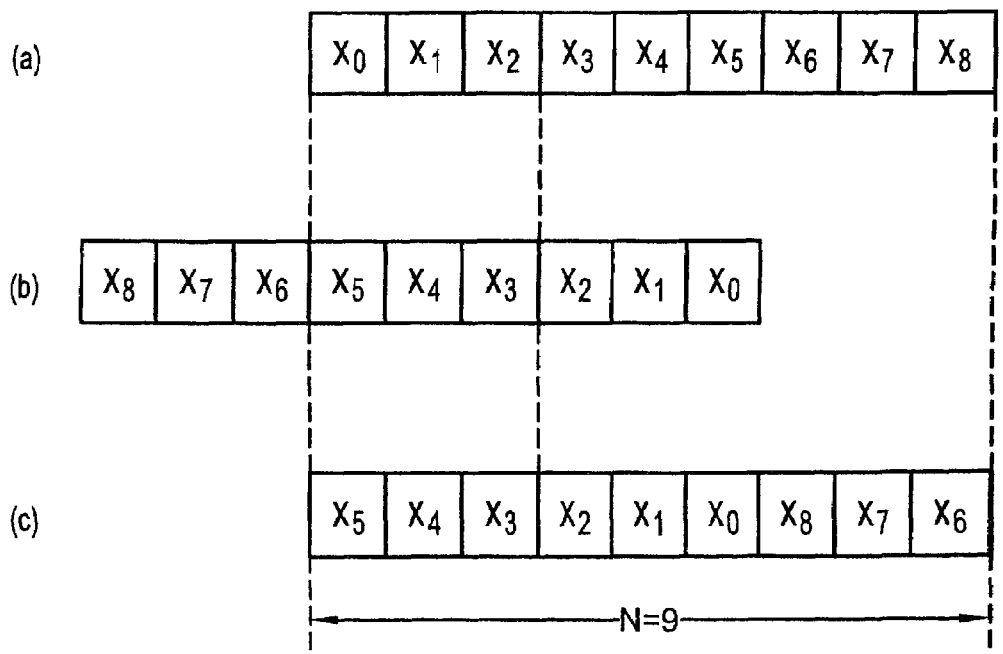
FIG. 6 illustrates another biased mirroring scheme according to an embodiment where a fractional mirror position is used.

FIG. 5 depicts the biased mirroring scheme where the centre position parameter $\gamma$ is an integer number. In the example of FIG. 5, $\gamma$ is equal to 3. In a first step, the sequence is mirrored to obtain the sequence of (b) of FIG. 5, and the symbol positions $x_9$, $x_8$ and $x_7$ are then wrapped around to obtain sequence (c). In the example of FIG. 6, the centre position parameter $\gamma$ is equal to 2.5 so that a mirroring axis is given between positions $x_2$ and $x_3$.

Thus, the positions are mirrored with wrap around in case the mirrored vector exceeds the boundaries. The parameter $\gamma$ is an integer multiple of 0.5 ranging from 0 to N−0.5. To obtain a mirroring process that is not biased, the parameter $\gamma$ is set to N/2.

Again, the sequence of step (b) is shown for explanation reasons only and is not necessarily explicitly performed.

Further, the biased mirroring is preferably done on the input sequence, but in another embodiment, the output sequence is modified instead of or in addition to the input sequence:

$$p_i = \langle \gamma^{in}, \gamma^{out} \rangle_i.$$

A further embodiment for obtaining distinct interleaver patterns is to use variations of the pseudo-random noise generator polynomial. It will be appreciated that the embodiment may be particularly used for decorrelating PN interleavers (or pseudo-noise interleavers or pseudo-random interleavers). As already described above, in a classical block interleaver the input data is written along the rows of a set of memory elements configured as a matrix, and is then read out along the columns. The PN interleaver is a variation of the classical block interleaver in which the data is written to memory in sequential order and read out in a pseudo-random order. A random interleaver is a permutation block interleaver that is generated from a random permutation based on a random noise source. For example, a noise vector of a given length is generated and the permutation that puts the noise vector in sorted order is used to generate the interleaver. In practice, the noise vector itself may be generated by a pseudo-random noise generator.

Figure 7:
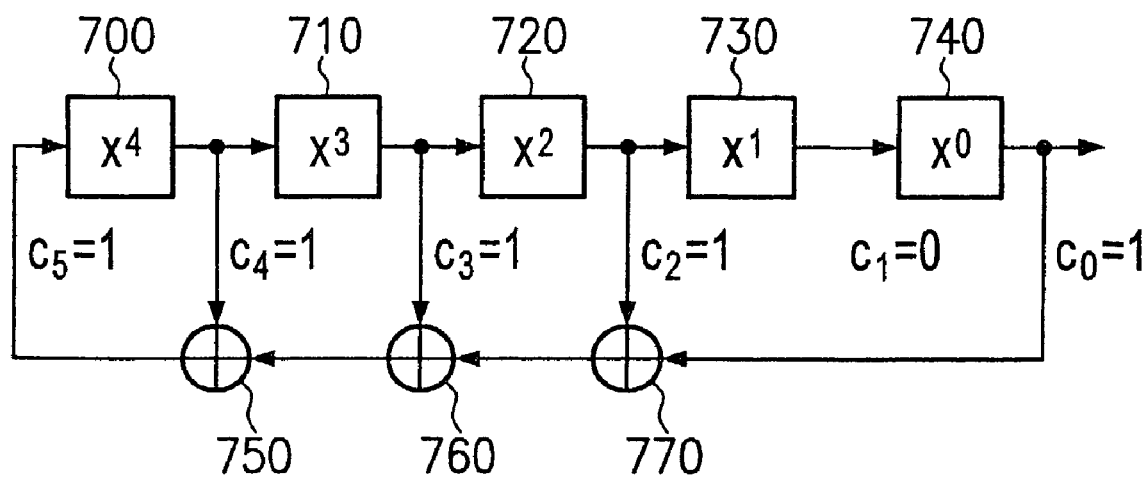
FIG. 7 depicts an LFSR than can be used with an embodiment.

A well know technique for pseudo-random noise generators is the usage of linear feedback shift registers (LFSR), an example thereof being shown in FIG. 7. The LFSR consists of a sequence of delay elements such as D flip-flops 700, 710, 720, 730, 740 that store data values $x^j$, j=0, 1,2,3,4. The stored data values are fed back to the input of the LFSR according to individual weighting factors $c_j$. Thus, the feedback can be described by a polynomial of the form $$v(x) = \sum_{j=0}^{L-1} c_j x^j$$

where L is the number of tabs, i.e. the number of stages of the LFSR. In the example of FIG. 7, the polynomial is $v(x) = x^4 + x^3 + x^2 + x^0$ since $c_1 = 0$ and $c_0 = c_2 = c_3 = c_4 = 1$.

One example of how derive a PN sequence from such a register is to use the content of each tap and interpret this as binary representation of an integer number. Alternative schemes are apparent to those of ordinary skill in the art and are therefore not discussed herein in more detail.

Thus, in the present embodiment the interleaver pattern parameters $p_i$ are unique generator polynomials that are different in each data stream:

$$p_i = v_i(x) = \{c_j | j=0, \ldots, L-1\}_i.$$

As the period of the pseudo-random sequence should be at least N, in an embodiment, there are N of the provided values used for obtaining the pseudo-random noise vector in case the pseudo-random sequence is greater than N. Preferably, the N lowest values are selected.

Further, it is preferable to choose as many different generator polynomials with the described proprieties as possible. However, for ease of implementation, those polynomials that fit the requirements with the smallest memory length L, i.e. the number of stages, are selected.

In a further embodiment, LFSRs are applied in much the same way as previously described but the interleaver pattern parameters $p_i$ indicate initialisation values of these LFSR, that are unique for each stream. It is well known that m-sequences are defined as linear feedback shift registers with L stages which produce the maximum possible period $q^L - 1$ where q is set to 2 in binary LFSRs. The shift registers have to be initialised with a set value $\kappa$ where $0 < \kappa < q^L$. This initialisation value has direct impact on the sequence of values with the noise vector. The value $\kappa$ is therefore used as interleaver pattern parameters $p_i$:

$$p_i = \kappa_i.$$

While in the description above several embodiments have been discussed that can be used for obtaining distinct interleaver patterns, combinations of some or all of the above described schemes can be used to increase the number of possible distinct interleavers since each parameter can be set individually and independently. This means, that the interleaver pattern parameters $p_i$, i=1,2,3, are multi-value tuples containing one or more cyclic shifting parameters $\pi$, $\pi^{in}$, $\pi^{out}$ and/or one or more biased mirroring parameter $\gamma$, $\gamma^{in}$, $\gamma^{out}$ and/or a unique pseudo-random noise generator polynomial $\nu$ and/or a unique initialisation value $\kappa$, e.g.

$$p_i = <\pi^{in}, \pi^{out}, \gamma^{in}, \gamma^{out}, \{c_j | j=0, \ldots, L-1\}, \kappa>_i.$$

Further, different LFSR sequence lengths L can be used. It will be appreciated that the system of the embodiment includes mechanisms for avoiding those parameter combinations that lead to identical interleavers.

Figure 1:
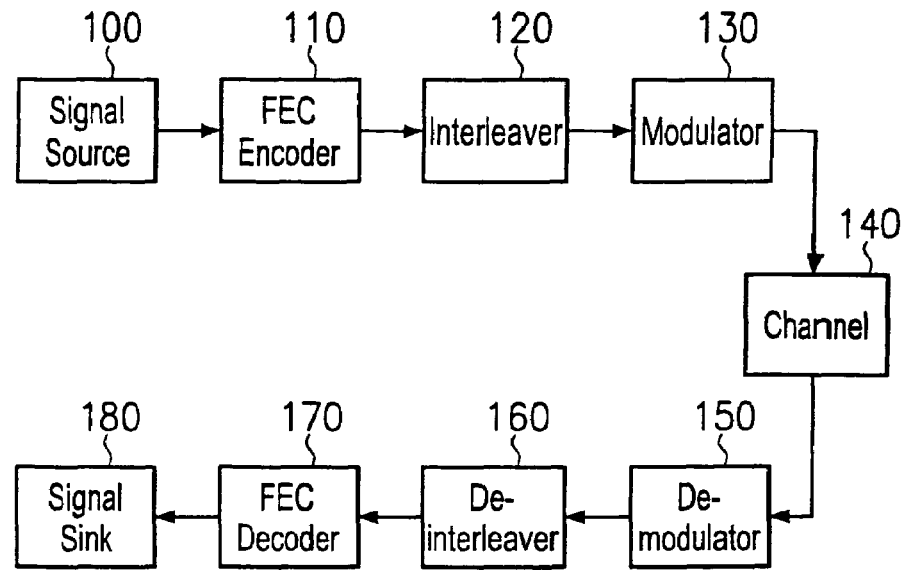
FIG. 1 depicts a communication system employing interleaving techniques.
Figure 2:
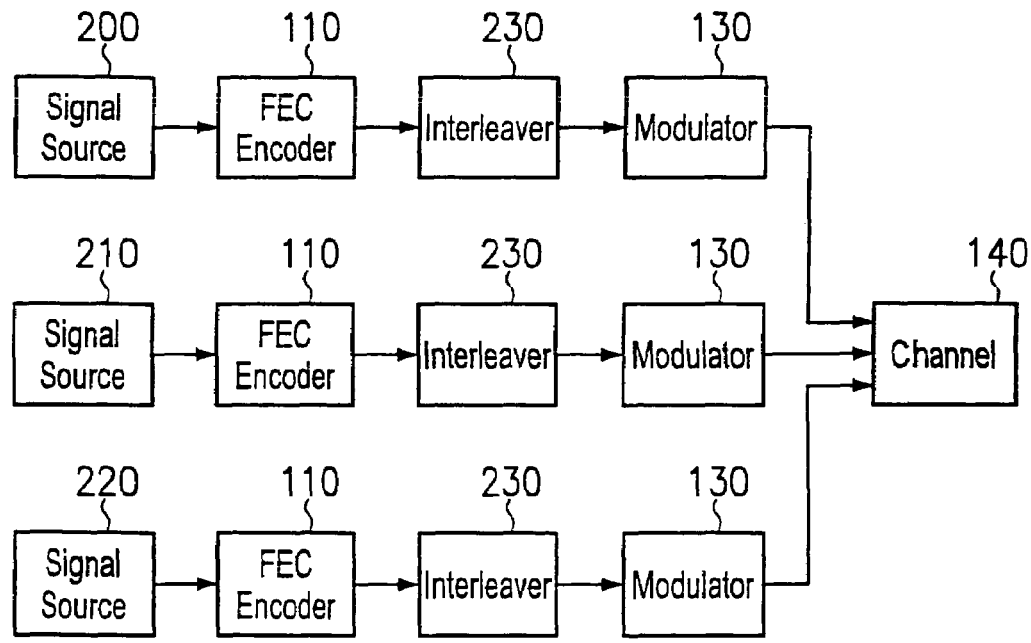
FIG. 2 illustrates the transmitter side of a communication system where data from multiple sources are conveyed on one and the same channel, according to the prior art.

Further, while in FIG. 3 the interleavers 300, 310, 320 are depicted as replacing the mother interleavers 230 of FIG. 2, it will be appreciated that the transmitters, and inversely the receivers, might include the mother interleavers 230 in addition to a modification block to obtain the distinct interleavers 300, 310, 320. Thus, it is an embodiment to provide an additional block to the mother interleaver 230 for each stream, or to provide interleavers 300, 310, 320 that replace the mother interleaver 230 in each stream. Similarly, implementations can be done by adding blocks before or after the mother interleaver, or by replacing the mother interleaver with distinct interleaver blocks which explicitly follow the functionalities given above.

Moreover, in a further embodiment, the interleaver functionalities are varied with time. If the interleaver pattern parameters $p_i$ are tuples containing multiple values, the time variation can apply to each of these values or to only some of them.

If it should not be possible to avoid such parameter combinations that result to identical individual interleavers in the data streams, the parameters are preferably chosen in a manner that the number of identical interleavers is reduced to the most extent.

As will be appreciated by those of ordinary skill in the art, the technique that has been described in the foregoing allows for decorrelating interleavers for synchronised data transmission. It is well known that in a communication system that includes forward error correction (FEC) interference bursts have more impact on the decoder performance than a multitude of distributed signal errors. Therefore, the embodiment allows for distributing existing burs interference between two streams to less bursty or signal errors in each stream before the FEC code is decoded. This is done in the embodiments described above for instance by obtaining a multitude of interleavers out of a generic interleaver, i.e. out of the mother interleaver.

Error decorrelation using distinct interleaver patterns is particularly advantageous where the data streams do not differ from each other with respect to the code block length, spreading factor, coding rate etc. The embodiment is therefore in particular suitable for HSDPA (High-Speed Downlink Packet Access) with multi-code transmission within the 3GPP context.

In a CDMA (Code Division Multiple Access) system, a handy way of choosing the parameters is to use the spreading code number $\sigma$:

$$p_i = \sigma_i.$$

In the example of the 3GPP context, currently a maximum of 512 spreading codes are used simultaneously within one cell, each spreading code representing one data stream.

Another embodiment is to use a simple relation between the interleaver pattern parameters $p_i$, in particular the shifting parameter $\pi$, and the data stream ID:

$$p_i = \pi_i = g(\text{data stream ID})$$

where g is an arbitrary function that converts the integer data stream ID into the interleaver pattern parameter $p_i$. This function can also be applied to obtain the cyclic shift parameters $\pi^{in}$, $\pi^{out}$ for shifting the input or output sequence.

For the mirroring parameters $\gamma$, $\gamma^{in}$, $\gamma^{out}$, an arbitrary function h is chosen for converting the integer data stream ID into the integer multiple of 0.5 biased mirroring parameter:

$$p_i = \gamma_i = h(\text{data stream ID})$$

Again, the function can be used for mirroring the input as well as the output sequence.

In a further embodiment, the functions g and h are chosen to be the identity function, i.e.

$$p_i = \pi_i = \text{data stream ID}$$

and $$p_i = \gamma_i = \text{data stream ID}.$$

As apparent from the foregoing, the embodiments provide a method of interleaving a source data stream using an interleaver pattern in a transmitter. A mother interleaver pattern and an interleaver parameter are accessed. The mother interleaver pattern is modified using the interleaver parameter. Then, the modified interleaver pattern is applied in the transmitter for interleaving the source data stream. The interleaver parameter used by the transmitter for modifying the mother interleaver pattern differs from the interleaver parameter used simultaneously by at least one other transmitter that transmits data at the same time on the same channel. There is further provided a corresponding deinterleaving method. By decorrelating the interleaver processes in the different streams, the inter-stream interference may be reduced.

According to an embodiment, each interleaver uses an interleaver pattern that differs from the interleaver patterns used simultaneously by the other transmitters that transmit data on the same channel. Interleaver patterns are known to describe the characteristics of the interleaver. For instance, in the permutation example above, the interleaver patter corresponds to the function f(k). A channel is any physical or logical entity that is used for conveying data of different transmitters in such a way that interference can occur.

By using distinct interleaver patterns for each of a plurality of data transmitting devices, inter-stream burst errors are transformed into a multitude of either short burst errors or single errors. Thus, the embodiments are particularly advantageous when burst errors are the result of the inter-stream interference.

This is because generally, interference between streams is more or less bursty in nature, i.e. it results in blocks of errors of a length of more than one information unit. By transforming the burst interference into a multitude of shorter errors, the embodiments improve over the system depicted in FIG. 2 as they allow to decorrelate the interleavers. In the conventional system, all data streams use identical interleavers and FEC codes. If some error pattern occurs that cannot be corrected by the FEC decoder, this will happen to all data streams since the error pattern will also be identical, i.e. fully correlated. By using different interleavers, the error patterns are decorrelated so that in some of the data streams the error pattern still cannot be corrected while in other data streams that have different error patterns, correction can be successfully done. Thus, the embodiments advantageously increase the system performance.

Moreover, the embodiments improve over the conventional FEC schemes because these techniques are either designed to be most effective for single errors (e.g. convolutional code, turbo code) or burst errors (e.g. Reed-Solomon code). In contrast thereto, the embodiments advantageously allow to distribute the occurring burst errors into a sequence of smaller bursts or single errors.

Furthermore, the embodiments can easily be implemented in transmitters and receivers, in particular when the interleaver functionality is constant over time. However, the embodiments can also be used with interleaver functionalities that vary with time if this should be necessary from a communication system's design point of view. Thus, the embodiments can be easily adapted to different system designs in a flexible manner.

The embodiments are in particular suitable for HSDPA with multi-code transmission within the 3GPP ($3^{rd}$ Generation Partnership Project) context because error decorrelation using distinct interleaver patterns is particularly applicable in systems where the data streams do not differ from each other with respect to any other parameter such as the code block length, spreading factor, coding rate etc.

The embodiments will also have beneficial effects on interference rejection or interference cancellation techniques without affecting their structure. With these schemes at some points an estimate is formed on the transmitted data. Again, if for instance convolutional FEC codes are used, if there is a wrong estimate, this is most probably of bursty nature. Thus, the provision of distinct interleavers according to the embodiments will also enable the decorrelation of the mentioned bursty wrong estimates which are then less harmful to the FEC decoder.

The embodiments are in particular applicable to Direct-Sequence CDMA systems like UMTS (Universal Mobile Telephone Service) which is a third generation (3G) mobile system being developed by ETSI within the ITU's IMT-2000 framework.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method of interleaving a source data stream using an interleaver pattern in a transmitter, the method comprising:
   accessing a mother interleaver pattern;
   accessing an interleaver parameter;
   modifying said mother interleaver pattern using said interleaver parameter by performing biased mirroring of source data stream vector elements using a mirroring position that is given by said interleaver parameter; and
   applying said modified interleaver pattern in said transmitter for interleaving said source data stream; wherein
   said interleaver parameter used by the transmitter for modifying said mother interleaver pattern differs from the interleaver parameter used simultaneously by at least one other transmitter that transmits data at the same time on the same channel.

2. The method of claim 1 wherein modifying said mother interleaver pattern further comprises wrapping around vector elements of the data stream.

3. A transmitter comprising:
   an interleaver for interleaving a source data stream using an interleaver pattern, said interleaver adapted for accessing a mother interleaver pattern, accessing an interleaver parameter, modifying said mother interleaver pattern using said interleaver parameter, and applying said modified interleaver pattern for interleaving said source data stream; wherein:
   said interleaver parameter used by the transmitter for modifying said mother interleaver pattern differs from the interleaver parameter used simultaneously by at least one other transmitter that transmits data at the same time on the same channel, and
   said interleaver modifies said mother interleaver pattern by performing biased mirroring of source data stream vector elements using a mirroring position that is given by said interleaver parameter.

4. The transmitter of claim 3 wherein said interleaver further modifies said mother interleaver pattern by wrapping around vector elements of the data stream.

5. A method of deinterleaving a data stream using a deinterleaver pattern in a receiver, the method comprising:
   accessing a mother deinterleaver pattern;
   accessing a deinterleaver parameter;
   modifying said mother deinterleaver pattern using said deinterleaver parameter by performing biased mirroring of data stream vector elements using a mirroring position that is given by said deinterleaver parameter; and
   applying said modified deinterleaver pattern in said receiver for deinterleaving the data stream; wherein
   said deinterleaver parameter used by the receiver for modifying said mother deinterleaver pattern differs from the deinterleaver parameter used simultaneously by at least one other receiver that receives data at the same time on the same channel.

6. The method of claim 5 wherein modifying said mother deinterleaver pattern further comprises wrapping around vector elements of the data stream.

7. A receiver comprising:
   a deinterleaver for deinterleaving a data stream using a deinterleaver pattern, said deinterleaver adapted for accessing a mother deinterleaver pattern, accessing a deinterleaver parameter, modifying said mother deinterleaver pattern using said deinterleaver parameter, and applying said modified deinterleaver pattern for deinterleaving said data stream; wherein:
   said deinterleaver parameter used by the receiver for modifying said mother deinterleaver pattern differs from the deinterleaver parameter used simultaneously by at least one other receiver that receives data at the same time on the same channel, and
   said deinterleaver modifies said mother deinterleaver pattern by performing biased mirroring of data stream vector elements using a mirroring position that is given by said deinterleaver parameter.

8. The receiver of claim 7 wherein said deinterleaver further modifies said mother deinterleaver pattern by wrapping around vector elements of the data stream.

* * * * *